United States Patent [19]

Klima

[11] 4,445,791
[45] May 1, 1984

[54] ROTARY DRILL BIT BALL PLUG

[76] Inventor: Frank J. Klima, 1401 W. Chestnut St., Virginia, Minn. 55792

[21] Appl. No.: 429,495

[22] Filed: Sep. 30, 1982

[51] Int. Cl.³ .................. F16C 33/30; F16C 33/64; E21B 10/22
[52] U.S. Cl. .................. 384/96; 175/370; 308/198
[58] Field of Search .............. 384/96, 94, 92, 95, 384/93; 308/198; 175/370, 366, 371, 372

[56] References Cited

U.S. PATENT DOCUMENTS

| | | | |
|---|---|---|---|
| 1,779,587 | 10/1930 | Childs | 175/370 X |
| 2,676,790 | 4/1954 | Turner | 384/92 X |
| 3,862,762 | 1/1975 | Millsap | 384/94 X |
| 3,989,315 | 11/1976 | Murdoch | 384/96 |
| 4,014,595 | 3/1977 | Dolezal | 384/94 X |
| 4,183,417 | 1/1980 | Levefelt | 384/94 X |
| 4,211,453 | 7/1980 | Johansson | 384/93 |
| 4,256,193 | 3/1981 | Kunkel et al. | 384/92 X |

FOREIGN PATENT DOCUMENTS 24742  2/1906  Austria ........................ 308/198

Primary Examiner—Lenard A. Footland
Assistant Examiner—Thomas R. Hannon
Attorney, Agent, or Firm—Peterson, Palmatier, Sturm, Sjoquist & Baker, Ltd.

[57] ABSTRACT

A removable ball loading hole plug for a rotary cutter rock drilling bit having an offset head portion to position the inner race end axially and rotationally. A locking groove on the outer surface of the offset head portion coacts with an adjacent end of a threaded retainer for removable locking engagement therewith.

4 Claims, 3 Drawing Figures

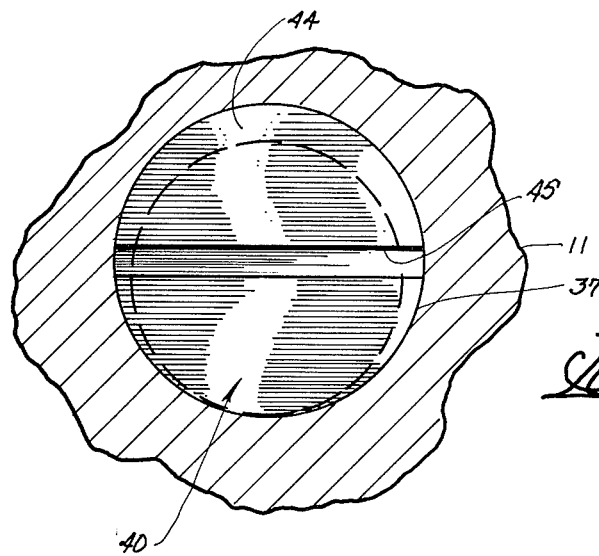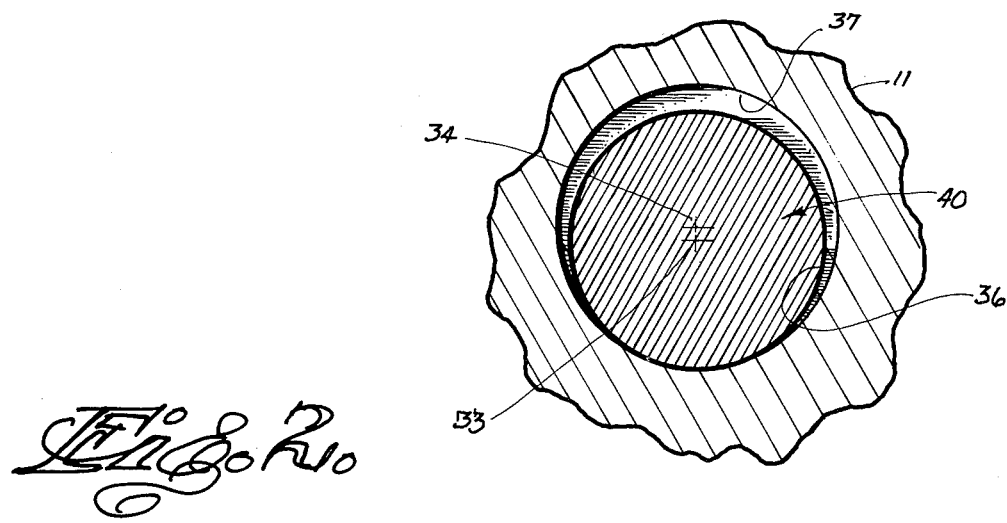

ROTARY DRILL BIT BALL PLUG

BACKGROUND OF THE INVENTION

1. Field of the Invention

This invention relates generally to rotary drill bits and is more particularly directed to a removable ball plug for inserting or removing ball bearings from a ball bearing race in the class of rotary drill bits wherein a race for ball bearings is formed in the journal and on the interior of a cutter cone which, upon the insertion of a plurality of ball bearings serves to retain the rotating cutter cone in operating disposition on the journal on a leg of a rotary drill bit.

2. Description of the Prior Art

The following prior art was noted in the course of a preliminary investigation concerning the invention of this application;

| U.S. Pat. No. | Inventor | Issued |
|---|---|---|
| 1,779,587 | Childs | October 28, 1930 |
| 2,676,790 | Turner | April 27, 1954 |
| 3,862,762 | Millsap | January 28, 1975 |
| 3,989,315 | Murdoch | November 2, 1976 |
| 4,014,595 | Dolezal | March 29, 1977 |
| 4,211,453 | Johansson | July 8, 1980 |

Of the above U.S. patents, the Turner U.S. Pat. No. 2,676,790 and Murdoch U.S. Pat. No. 3,989,315 illustrate earlier attempts to provide removable ball plugs in roller bits that incorporate ball bearings for purposes that include the retention of a cutter cone on a journal. As will be recognized upon a thorough consideration of the respective disclosures, each of the patents represent an unduly complicated structure for providing the desired result. Each of the references requires at least three elements for obtaining the desired result. One present method of securing the ball plug is to fill in the outer portion of the ball hole by welding. Manufacturers tend to shallow up the outer portion of the ball plug hole to require less weld material and less change of heat build-up. Welding may also lead to destruction of the heat treated bearing race and seals. The shallow weld-filled hole may wear off during drilling with consequent loss of ball plug and retainer ball bearings and pre-mature rock bit failure.

BRIEF SUMMARY OF THE INVENTION

My invention provides a facile arrangement for assembling and subsequent servicing of roller cone drill bits of the type utilizing a ball bearing retainer for maintaining the cutter cone in operative disposition on a journal on a leg of a rotary drill bit. This is accomplished by providing a bore through the journal consisting of an inner section of reduced diameter and an outer section of larger diameter and having a center line that is offset from the center line of the inner portion of smaller diameter. A ball plug, having an inner end configured to the shape of a ball bearing race on the journal and a diameter of the hole of smaller diameter is provided with a head portion, the diameter of the outer portion of the hole and the head is offset with respect to the inner end of the ball plug so that when the ball plug is inserted in the hole with the head positioned in the outer portion thereof, the inner portion that is configured to coact with the ball bearing race on the journal is oriented in the desired position. The outer portion of the hole may include an intermediate threaded portion for receiving a threaded locking element in the form of a setscrew. The outer end of the offset head portion of the ball plug may further be provided with a slot that is useful for orientation in assembly and to coact with the inner end of a setscrew to enhance the locking engagement therewith. The inner portion of the ball plug may further be provided with an O-ring seal for preventing the loss of lubricant disposed about the journal and within the cutter cone.

It is therefore an object of my invention to provide an improved ball plug for a roller cone drill bit.

Other objects and advantages of my invention will become apparent from the appended drawings, description and claims.

BRIEF DESCRIPTION OF THE DRAWINGS

FIG. 2 is an enlarged fragmentary sectional view taken along section line 2—2 in FIG. 1; and FIG. 3 is an enlarged fragmentary sectional view taken along section line 3—3 in FIG. 1 of the drawings.

DESCRIPTION OF THE ILLUSTRATED EMBODIMENT

Figure 1:
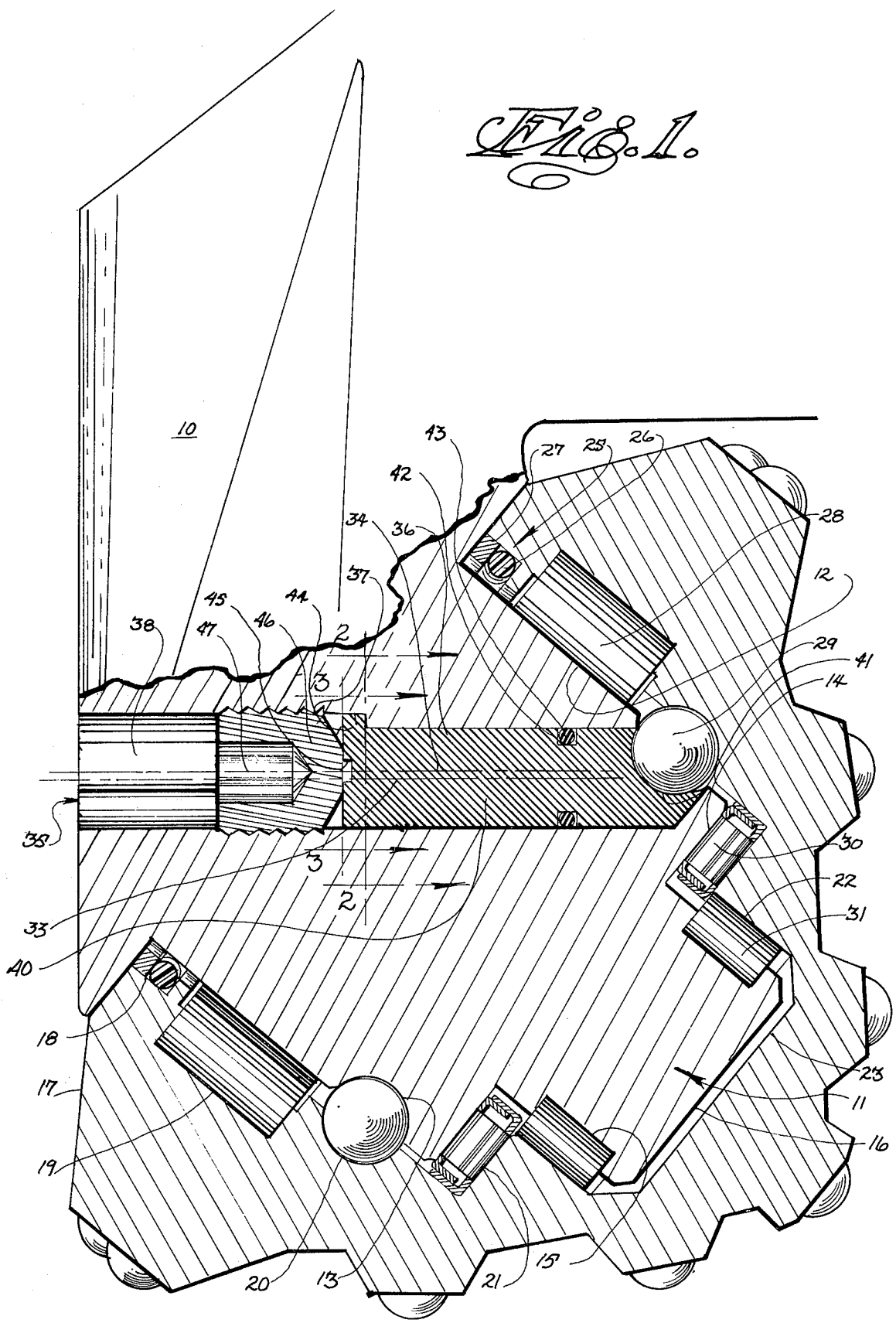
FIG. 1 is a partial sectional view of a portion of one leg of a rotary drill bit illustrating the present invention.

Referring to FIG. 1 of the drawings, the lower end of a rotary drill bit leg is indicated generally by reference character 10. Rotary drill bit leg 10 includes an angled circular journal 11 for rotatably receiving and mounting a rotating cone cutter 17 having a plurality of insert cutters to engage and break up formations in the earth as the drill bit is rotated and lowered into the earth.

Journal 11 includes an axially extending upper bearing surface 12, an intermediate ball bearing race 13, an intermediate radially-extending roller thrust bearing surface 14, a lower roller bearing race 15, and lower end 16.

Cutter cone 17 includes an upper seal groove 18, an upper roller bearing race 19, an intermediate ball bearing race 20, a radially-extending roller thrust bearing surface 21, an axially-extending lower roller bearing surface 22 and a lower end 23.

A seal, indicated generally by reference character 25 and consisting of an O-ring 26 and a cast iron ring 27 is disposed in the upper seal groove of cone 17 adjacent to journal 11 to prevent the entry of contaminants formed in the drilling process as well as to prevent the loss of lubricant disposed within the space between circular cutter cone 17 and journal 11.

Similarly, a plurality of upper roller bearings 28, ball bearings 29, thrust roller bearings 30 and lower roller bearings 31 are disposed intermediate the bearing surfaces and races and, while not shown in the drawings, extend completely around and intermediate the respective surfaces and races therefor.

A ball plug hole is indicated generally by reference character 35 and includes an inner end of lesser diameter formed about a center line 33 and an enlarged outer portion that is formed about center line 34 that is offset from center line 33 and includes a threaded portion 37 intermediate the inner end 36 and outer end 38.

Ball plug 40 having an inner end coaxial with center line 33 and a diameter slightly less as the inner end of ball plug hole 35 is provided with a surface configuration 41 that is adapted to lie in, and form a part of, ball bearing race 13 on journal 11. A seal groove 42 and an O-ring seal 43 are shown disposed in the inner end of ball plug 40 and an offset head 44 that is coaxial with center line 34 on ball hole 35 is formed at the outer end and includes a laterally disposed, outwardly opening slot 45 for orientation and locking purposes. A setscrew retainer 46, having a drive socket 47, is shown disposed on threaded portion 37 of ball plug hole 35 and in locking engagement with offset head 44 on ball plug 40.

FIGS. 2 and 3 further illustrate the disposition of ball plug 40 and ball plug hole 35 to illustrate the cooperative engagement therebetween to position and retain ball plug 40 in the desired orientation after assembly. A steel plug of proper size or a wear resistant i.e. tungsten carbide plug may be driven in to further lock set screw or locking means from loosening during operation of the drill bit and provide additional resistance against abrasive wear of the lower leg portion.

OPERATION OF THE ILLUSTRATED EMBODIMENT

Assuming that the structure illustrated in the drawings is in a disassembled condition with the circular cutter cone in readiness for installation on journal 11 with the seal and roller bearings disposed in the respective races on cone 17 and journal 11, cone 17 is placed on journal 11 and the appropriate number of ball bearings 29, are inserted into ball bearing races 13 and 20 on journal 11 and cone 17 respectively. Ball plug 40, in the configuration of the illustrated embodiment, is inserted into ball plug hole 35 with the slot 45 in offset head 44 in the position shown to indicate to the assembler that inner end 41, to form a part of ball bearing race 13 on journal 11, is in its proper orientation. Ball plug 40 is inserted and a suitable retainer means, shown in the form of a setscrew 46, which may have a serrated inner cone surface, is threaded into position to effect locking engagement with the outer end of offset head 44 and slot 45.

The disassembly of the roller bit, for any reason, is reasily accomplished by a reverse of the above procedure and the operations of assembly and disassembly may be effected as often as may prove necessary during the life of the roller drill bit. In the event frequent disassembly is desired, a threaded hole may be provided in offset head 44 to facilitate withdrawal of ball plug 40.

It may now be seen that the offset portions of ball plug hole 35 and ball plug 40 provide a cooperable arrangement permitting the use of a single element ball plug for effecting the proper orientation of the inner end 41 and to retain the ball plug 40 securely against rotation.

What is claimed is:

1. In a rotary drill bit of the class including a rotary cutter operable on a journal on a leg of the bit and rotatably retained thereon by a plurality of ball bearings disposed between complementary configured and disposed races in said cutter and said journal, a locking, removable ball bearing retaining plug comprising, in combination;

an access hole extending through the leg and journal of a drill bit into a ball bearing race in said journal, said access hole having an inner section of a first diameter disposed about a first center line and adjacent a ball bearing race and an outer section of larger diameter formed about a center line that is offset from the center line of said inner section; and a ball plug having an inner portion of the same diameter as the inner portion of said access hole and an outer head portion of the same diameter as the outer portion of said access hole and offset from the inner portion of said ball plug.

2. The apparatus of claim 1 in which an outwardly opening slot is disposed across the outer head portion of the ball plug.

3. The apparatus of claim 2 in which retainer means are disposed in the outer portion of the access hole in locking engagement with the outer head portion of the ball plug.

4. The apparatus of claim 1 in which a seal means is disposed intermediate the periphery of the inner portion of the ball plug and the inner portion of the access hole.

* * * * *

UNITED STATES PATENT AND TRADEMARK OFFICE
CERTIFICATE OF CORRECTION

PATENT NO. : 4,445,791
DATED : May 1, 1984
INVENTOR(S) : Frank J. Klima

It is certified that error appears in the above—identified patent and that said Letters Patent are hereby corrected as shown below:

Column 3, line 5, delete "47" and substitute --37--.

Column 3, line 6, delete "37" and substitute --47--.

Column 3, line 39, delete "reasily" and substitute --easily--.

Signed and Sealed this

Ninth Day of April 1985

[SEAL]

Attest:

DONALD J. QUIGG

Attesting Officer     Acting Commissioner of Patents and Trademarks